(12) United States Patent
Singh et al.

(10) Patent No.: US 6,691,596 B1
(45) Date of Patent: Feb. 17, 2004

(54) CIRCULAR SAW BLADE FOR CUTTING FIBER CEMENT MATERIALS

(75) Inventors: Iqbal Singh, Lincoln, NE (US); Fabrice Malard, Pleasant Prairie, WI (US)

(73) Assignee: Irwin Industrial Tool Company, Freeport, IL (US)

(*) Notice: Subject to any disclaimer, the term of this patent is extended or adjusted under 35 U.S.C. 154(b) by 47 days.

(21) Appl. No.: 09/638,054

(22) Filed: Aug. 11, 2000

Related U.S. Application Data

(60) Provisional application No. 60/185,941, filed on Feb. 29, 2000.

(51) Int. Cl.[7] ............................................. B23D 57/00
(52) U.S. Cl. .............................................. 83/13; 83/835
(58) Field of Search ................................... 83/835–855

(56) References Cited

U.S. PATENT DOCUMENTS

| | | | |
|---|---|---|---|
| 23,330 A | 3/1859 | Wilson | |
| 167,308 A | 8/1875 | Daniels | |
| 214,390 A | 4/1879 | Hill | |
| 303,720 A | * 8/1884 | Gage et al. ................... | 83/849 |
| 388,820 A | * 9/1888 | Bundy ......................... | 83/850 |
| 392,534 A | * 11/1888 | Burner ........................ | 83/837 |
| 464,855 A | 12/1891 | Clark | |
| 558,466 A | 4/1896 | Bowles | |
| 754,134 A | 3/1904 | Granberg | |
| 1,333,767 A | 3/1920 | Napier | |
| 1,334,633 A | 3/1920 | Pioche | |
| 1,352,140 A | 9/1920 | Napier | |
| 1,811,079 A | * 6/1931 | Forsyth ....................... | 83/855 |
| 2,004,174 A | 6/1935 | Remington | |
| 2,216,728 A | 10/1940 | Benner et al. | |
| 2,326,674 A | 8/1943 | Pavitt | |
| 2,327,129 A | 8/1943 | Ronan | |
| 2,422,561 A | 6/1947 | Pavitt | |
| 2,569,054 A | 9/1951 | Herzog | |
| 2,850,056 A | 9/1958 | Kehl | |
| 3,224,094 A | 12/1965 | Esemplare | |
| 3,228,438 A | * 1/1966 | Serry ........................... | 83/853 |

(List continued on next page.)

FOREIGN PATENT DOCUMENTS

| | | |
|---|---|---|
| DE | 3047888 | 7/1982 |
| DE | 3416186 | 1/1985 |
| FR | 2380845 | 9/1978 |
| GB | 591839 | 8/1947 |
| GB | 856047 | 12/1960 |
| GB | 930596 | 7/1963 |
| JP | 58-171262 A | 10/1983 |

*Primary Examiner*—Allan N. Shoap
*Assistant Examiner*—Jason Prone
(74) *Attorney, Agent, or Firm*—Brinks Hofer Gilson & Lione

(57) ABSTRACT

A rotary saw blade for cutting fiber cement board materials. In one embodiment, a rotary saw blade is provided having a main body plate and a central opening with respect to an axis of rotation. A plurality of cutting teeth are disposed about the periphery of the plate. Arcuate tooth support portions extend rearwardly from the cutting teeth and have a center of curvature offset from the axis of rotation. Peaked shoulders having a forwardly sloping portion, a peak and a rearwardly sloping portion extend from the tooth support portions. The peaked shoulders partially define hook-shaped gullets between the shoulders and the cutting teeth.

22 Claims, 4 Drawing Sheets

U.S. PATENT DOCUMENTS

| | | |
|---|---|---|
| 3,496,973 A | 2/1970 | Ballard |
| 3,541,910 A | 11/1970 | Murray |
| 3,592,703 A | 7/1971 | Dehn et al. |
| 3,608,877 A | 9/1971 | Dehn |
| 3,688,139 A | 8/1972 | Yaguchi |
| 3,820,419 A | 6/1974 | McLagan |
| 3,866,504 A * | 2/1975 | Claesson et al. ............... 83/852 |
| 3,895,143 A | 7/1975 | Tarlow |
| 3,900,636 A | 8/1975 | Curry et al. |
| 3,982,359 A | 9/1976 | Elbel et al. |
| 3,990,338 A | 11/1976 | Wikner et al. |
| 4,010,818 A | 3/1977 | Westley |
| 4,043,404 A | 8/1977 | Sorlie et al. |
| 4,114,494 A | 9/1978 | Budke et al. |
| 4,144,777 A | 3/1979 | Nystrom et al. |
| 4,187,754 A | 2/1980 | Beaty |
| 4,215,613 A | 8/1980 | Anderson et al. |
| 4,232,578 A | 11/1980 | Stellinger et al. |
| 4,291,667 A | 9/1981 | Eichenlaub et al. |
| 4,310,999 A | 1/1982 | Onoue |
| 4,337,750 A | 7/1982 | Dutcher |
| 4,363,576 A * | 12/1982 | Zweekly ................... 83/845 X |
| 4,432,264 A | 2/1984 | Scott |
| 4,462,382 A * | 7/1984 | Baron et al. ................... 125/15 |
| D277,930 S | 3/1985 | Croydon |
| 4,578,984 A | 4/1986 | Bohman |
| D283,784 S | 5/1986 | Croydon |
| 5,033,579 A | 7/1991 | Vanderstraeten |
| 5,038,653 A | 8/1991 | Slocum et al. |
| 5,048,389 A * | 9/1991 | Carlton ........................ 83/838 |
| 5,085,113 A * | 2/1992 | Pinney ........................ 83/840 |
| 5,224,950 A | 7/1993 | Prywes |
| 5,261,306 A | 11/1993 | Morey et al. |
| 5,331,876 A | 7/1994 | Hayden, Sr. |
| 5,351,595 A | 10/1994 | Johnston |
| 5,425,296 A | 6/1995 | Kullmann et al. |
| 5,477,763 A | 12/1995 | Kullman et al. |
| 5,501,129 A | 3/1996 | Armstrong et al. |
| 5,555,788 A | 9/1996 | Gakhar et al. |
| D382,787 S | 8/1997 | Gakhar et al. |
| 5,713,259 A | 2/1998 | Haanschoten |
| 5,758,561 A | 6/1998 | Curtsinger et al. |
| 5,855,158 A | 1/1999 | Donofrio |
| 5,894,775 A | 4/1999 | Brash et al. |
| 5,947,805 A | 9/1999 | Van Osenbruggen |

\* cited by examiner

CIRCULAR SAW BLADE FOR CUTTING FIBER CEMENT MATERIALS

CLAIM FOR PRIORITY

The present patent claims priority to U.S. Provisional Application Serial No. 60/185,941, entitled CIRCULAR SAW BLADE FOR CUTTING FIBER CEMENT MATERIALS, filed on Feb. 29, 2000.

BACKGROUND OF THE INVENTION

Fiber cement materials are being used more frequently in outdoor applications in new construction. These fiber cement materials, often in the form of flat boards, are ideal for use as roof, wall and floor sheathing and wall siding. The boards may be fiber reinforced and silicone impregnated to provide uniform structural characteristics, while being resistant to fire, rot, water damage, insects and freezing.

Because of their heavy and stiff construction, fiber cement boards have the disadvantage of being more difficult to work with than conventional wood materials. In particular, the fiber cement boards are difficult to cut with conventional tools. While hand-held circular power saws are most often used to cut the boards, conventional saw blades and other types of blades have proven less than ideal for the task.

When used on fiber cement materials, conventional blades often produce a very rough, chipped cut edge. Furthermore, the stiff nature of the fiber cement boards provides significant resistance to the teeth of a conventional circular blade, thereby straining the motor of the power tool and producing a significant amount of frictional heat at the blade edge. This excess heat can dull the blade edge rapidly and compromise the construction of the braze joint between the blade and tooth tip portions.

These conventional blades also produce a tremendous amount of dust and flying debris when cutting fiber cement board, since they typically have a large number of teeth. The dust results in a difficult working environment for the user and the silica contained in the dust is a known health hazard. Furthermore, the dust reduces visibility for the user, which can have a significant effect on the accuracy of the cuts and prove dangerous to the user.

There is therefore a need for an improved saw blade design for use with fiber cement materials that alleviates the foregoing disadvantages.

BRIEF SUMMARY OF THE INVENTION

In accordance with one aspect of the present invention and in one embodiment thereof, a rotary saw blade is provided having a main body plate and a central opening with respect to an axis of rotation. A plurality of cutting teeth are disposed about the periphery of the plate. Arcuate tooth support portions extend rearwardly from the cutting teeth and have a center of curvature offset from the axis of rotation. Peaked shoulders having a forwardly sloping portion, a peak and a rearwardly sloping portion extend from the tooth support portions. The peaked shoulders partially define hook-shaped gullets between the shoulders and the cutting teeth.

In another aspect of the present invention, another embodiment of the invention may be provided in the form of a rotary saw blade for use in cutting fiber cement board material. The blade includes a generally circular main body plate having a central opening with respect to its axis of rotation. Cutting teeth are disposed about the periphery of the plate, and each tooth is preceded by a peaked shoulder. Each shoulder is at least partially defined by a forwardly sloping portion, a peak and a rearwardly sloping portion, wherein the rearwardly sloping portion has a length at least twice the length of the forwardly sloping portion. A hook-shaped gullet is defined at the periphery of the plate between each shoulder and the proximate cutting tooth. Each of the gullets is at least partially defined by the rearwardly sloping portion of an adjacent shoulder and an arcuate portion having a partially circular shape. A plurality of tooth support portions extends between the rear of each tooth to the forwardly sloping portion of the shoulder.

The invention may also be embodied in a method of cutting fiber cement board material. The method includes the steps of providing a handheld power tool and attaching a blade to the power tool. The blade includes a main body plate having a central opening with respect to an axis of rotation and between four and ten cutting teeth disposed about the periphery of the plate. A plurality of arcuate tooth support portions extend rearwardly from the cutting teeth and have a center of curvature offset from the axis of rotation, and a plurality of peaked shoulders are distributed about the periphery of the plate rearwardly of the tooth support portions. A plurality of hook-shaped gullets are further distributed about the periphery of the plate between the shoulders and the cutting teeth. A fiber cement board is then provided, and the board is cut using the power tool.

The saw blades of the preferred embodiments described herein provide improved means for cutting fiber cement materials such as flat rock wallboards and DUROCK® fiber board products. DUROCK® products are cement board products specially manufactured for use in potentially wet environments, such as for backing ceramic tile. The improved design disclosed herein incorporates fewer teeth than conventional blades and produces significantly less dust than conventional blade designs. The improved design also results in blades having a significantly longer life span than prior art blade designs or conventional carbide blades when used with fiber cement materials. The disclosed blades may be utilized with conventional-drive or worm-drive handheld circular saws or table saw equipment, and can facilitate all aspects of construction where fiber cement materials are used.

It is to be understood that both the foregoing general description and the following detailed description are exemplary and explanatory and are intended to provide further explanation of the invention as claimed. The invention, together with further objects and attendant advantages, will best be understood by reference to the following detailed description, taken in conjunction with the accompanying drawings.

BRIEF DESCRIPTION OF SEVERAL VIEWS OF THE DRAWINGS

These and other advantages of the present invention will become more fully apparent as the following description is read in conjunction with the drawings, wherein.

DETAILED DESCRIPTION OF THE INVENTION

Figure 1:
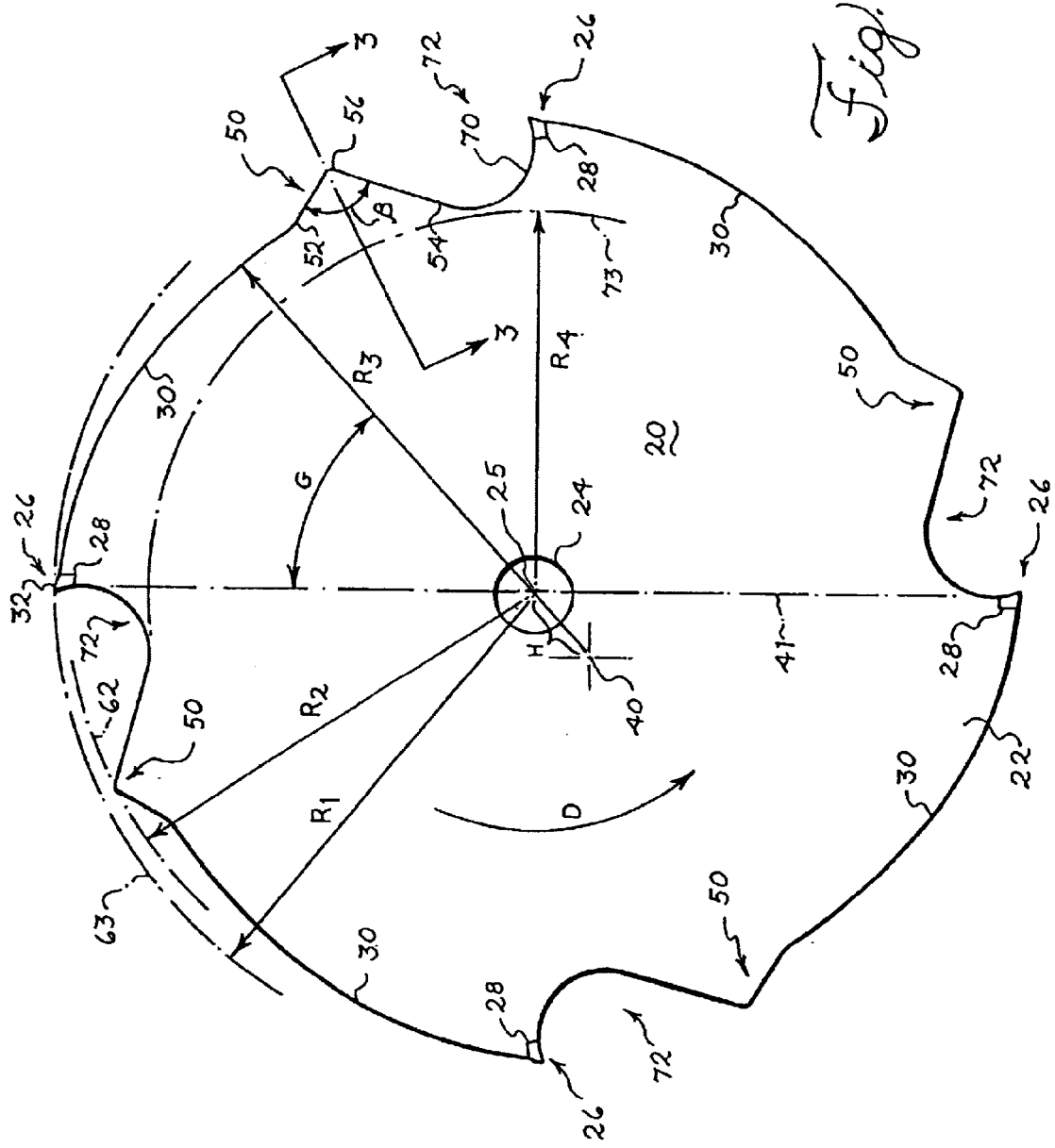
FIG. 1 is a side view of a circular blade of the preferred embodiment of the invention showing a four-tooth design.

Referring to the figures, FIG. 1 shows a side view of the circular saw blade 20 in a preferred embodiment having four teeth. The preferred blade 20 preferably includes a plate 22 having a hole 24 defined in the center thereof for mounting the saw blade 22 onto an arbor. Preferably, the metal plate 22 is generally circular in shape and is machined from flat-surface tool steel, and the thickness of the blade is approximately 0.063 inches, although 0.047 inches in thickness has been shown to be sufficient as well. The arbor hole 24 is preferably ⅝ inches diameter for use on standard arbors for hand-held circular saws.

In this four-tooth embodiment, four teeth 26 are distributed at equal distances about the periphery of the plate 22. The teeth 26 preferably include tooth tips 28 made from carbide, diamond particles or other suitable hard material. The tooth tips 28 are preferably brazed to the saw plate 22 at points of contact on the edge portion of a tooth support 30 located above the periphery of the plate 22.

Each arcuate tooth support 30 extends rearwardly from each tooth tip 28 of the tooth 26 and traces an arc that decreases in radial distance from the center 25 as a distance increases from the tooth 26. In the preferred embodiment, the tooth support portion 30 may also trace an arc that is offset from the center 25, as shown in FIG. 1. Radius R3 thus includes a center 40 that is offset a distance from the center 25. In the preferred embodiment, the radius is approximately 3.937 inches from the offset center 40. Preferably, the offset center 40 may be positioned relative to a centerline 41 of the plate 22 extending through the center 25 between oppositely located tooth tips 28. In particular, the offset center 40 is located on radius R3 angled at angle G (63 degrees) clockwise from centerline 41 and through the center 25. Along the radius R3, the center 40 is positioned approximately 0.63 inches beyond the centerline 41, denoted in FIG. 1 as distance H. The receding configuration of the tooth support 30 provided by this arc allows only a minimal amount of the blade plate 22 to contact the cut portion of the fiber material after the cut is made by each tooth tip 28.

The tooth support portion 30 terminates in a peaked shoulder 50. The shoulder 50 includes a forwardly sloping portion 52 and a rearwardly sloping portion 54, wherein the portions 52 and 54 meet in a peak 56. As shown in more detail in FIG. 2, the forwardly sloping portion 52 and the rearwardly sloping portion 54 generally comprise substantially straight edge portions of the saw plate 22. The two portions 52, 54 preferably meet at angle β, which preferably ranges between 90 and 110 degrees. In the preferred embodiment, the angle β is 105 degrees. The peak 56 may be either a edge or a slightly rounded portion having a radius of approximately 0.08 inches. In the preferred embodiment, the forwardly sloping portion 52 has a length l1 and the rearwardly sloping portion 54 has a length l2. Preferably, the length l2, which is approximately 0.96 inches in the preferred embodiment, is more than twice the length of l1, which is preferably 0.44 inches in the preferred embodiment. Although other lengths and angles may be utilized, it has been found that these angles produce the most desirable results.

Figure 2:
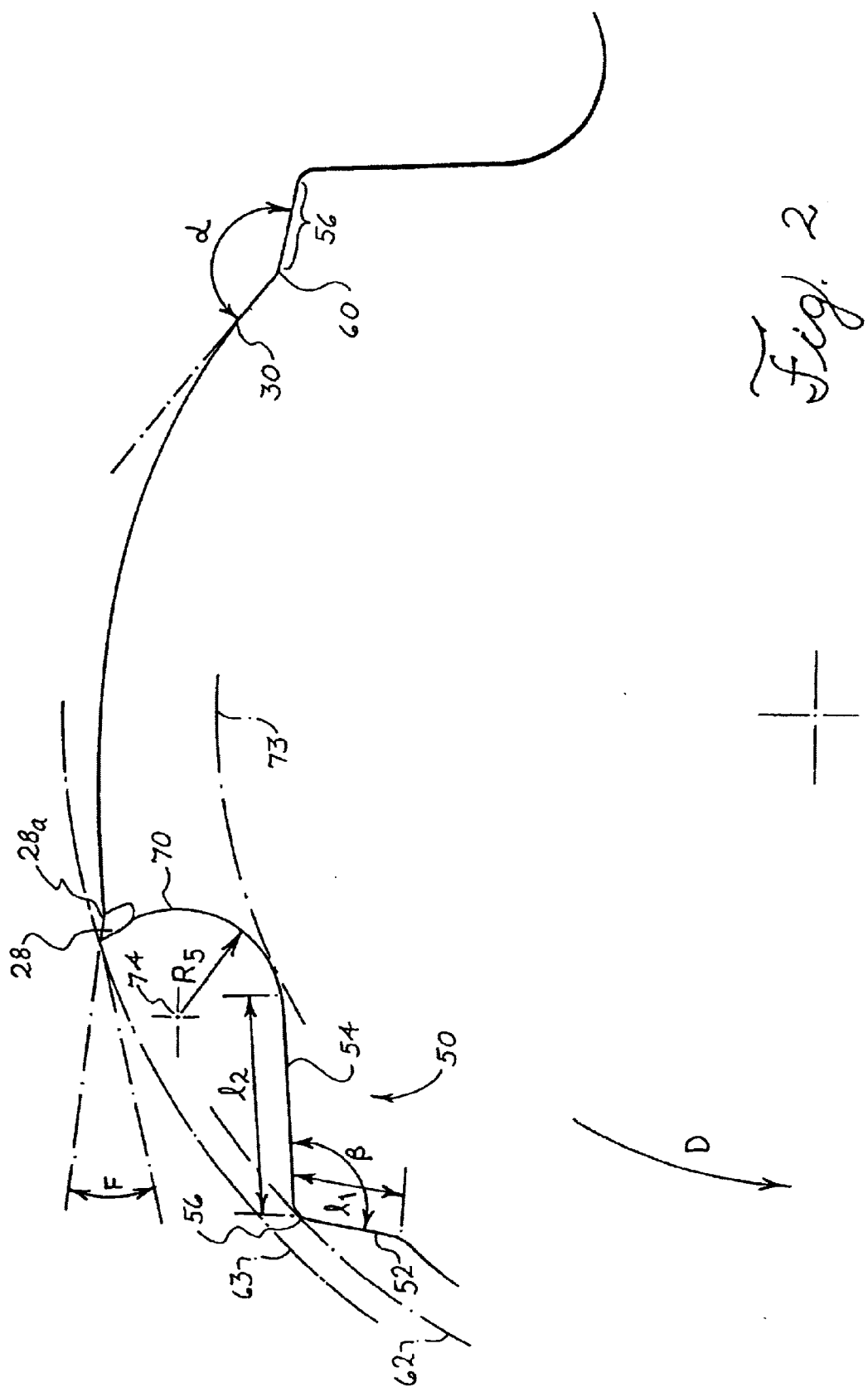
FIG. 2 is a side view of a segment of the circular blade of FIG. 1.

Angle α, as shown in FIG. 2, is the angle between the forwardly sloping portion 52 and the rearwardly sloping portion 54 of the tooth support 30. Angle α is preferably 153.4 degrees. A small radius 60 is preferably introduced at the juncture between support 30 and the portion 56. In the preferred embodiment, the radius is approximately 0.12 inches.

The outer edge 32 of each tooth tip 28 is located at a cutting arc 63 radius R1 distanced from the center rotational axis 25 of the blade 20. The radius R1 is the cutting radius wherein each tooth 26 first makes contact with and cuts the fiber board material during a cutting operation. In the preferred embodiment, the cutting radius R1 is 3.625 inches.

The outermost portion of the peak 56 on the shoulder 50 traces an arc 62, preferably at radius R2 from the center 25 of the blade 20. In the preferred embodiment, the radius R2 is approximately 0.1 inch less than radius R1 of the cutting edge of tooth 26. This allows the shoulder portion 50 to provide a guide ahead of each tooth 26 during the cutting process in direction D and prevents the tooth 28 from cutting substantially more than a 0.1 inch portion of the fiber board on each tooth pass. This prevents the blade from "kicking back" dangerously or otherwise becoming damaged if too large a portion of material is placed before the cutting edge of the blade.

Moving clockwise around the edge of the remaining portion of the blade 20, the lowermost portion of the rearwardly sloping portion 54 of the peaked shoulder 50 is formed with an arcuate section 70 to form a deep, hook-shaped gullet 72. The lowest point of each gullet 72 lies on a gullet arc 73 having a radius R4. Preferably, the radius R4 is 2.969 inches. The gullet 72 immediately proceeds each tooth 26 and provides a deep area from which to eject chips and debris from the cutting process of the tooth 26. The arcuate portion 70 of the gullet 72 preferably is formed having a radius R5 from the center 74 of the arc 70. In the preferred embodiment, the radius R5 is approximately 0.52 inches and extends upwardly towards the bottom of the tooth tip 28 and contacts gullet arc 73. The shape of the gullet arcuate section 70, in combination with the forward portion 52 of the peaked shoulder 50, assists in removing debris from the material to be cut and reducing the amount of dust generated by the cutting process.

Figure 3:
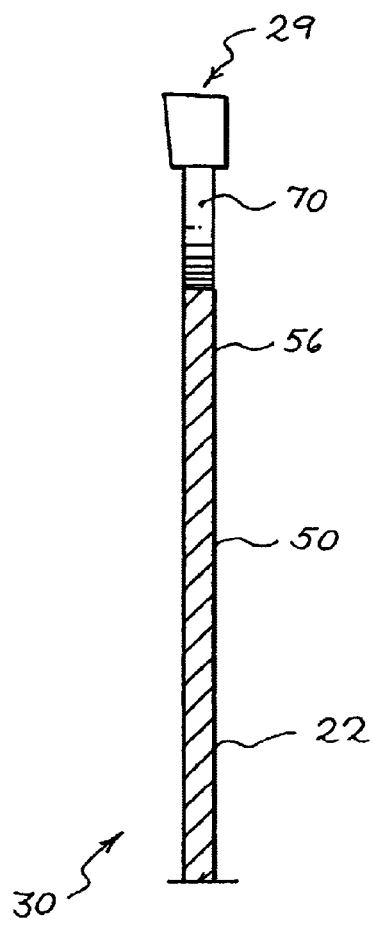
FIG. 3 is a cut-away view of the preferred embodiment of FIG. 1 taken along the line 3—3.
Figure 5:
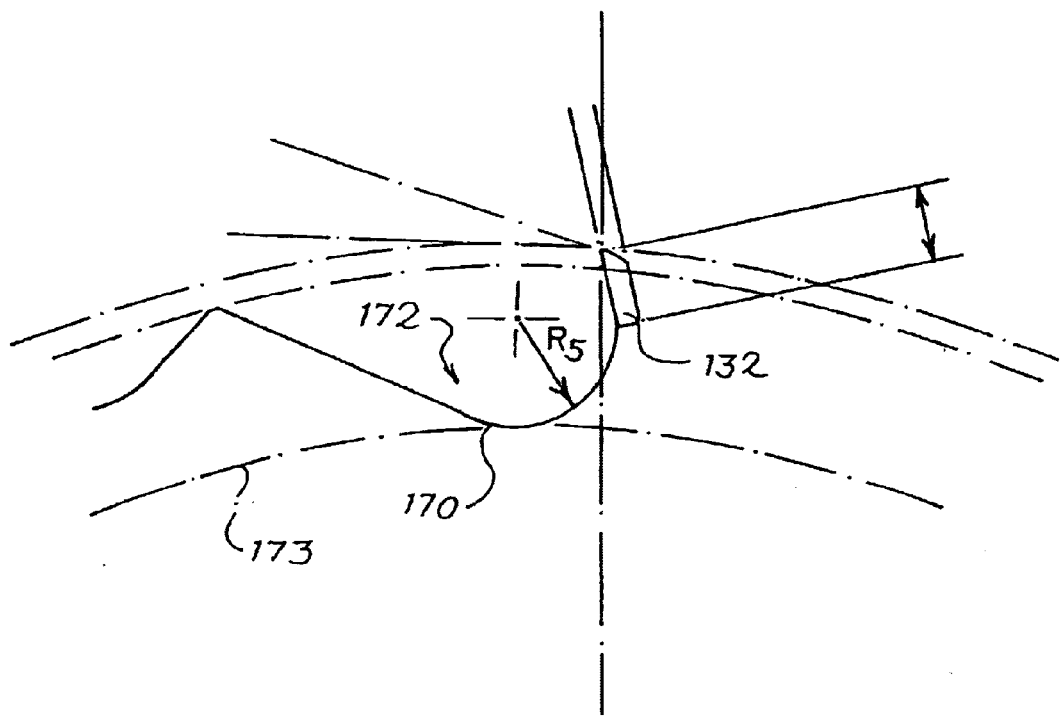
FIG. 5 is a side view of a segment of the blade of FIG. 4.

Preferably, the tooth tips 28 in the preferred embodiment are formed from a tungsten carbide material with a layer of poly crystalline diamond ("PCD") bonded thereon. The hook angle of the cutting tip is approximately 15 degrees. The angle F of the top edge 28a of tooth tip 28 is preferably about 12 degrees, and the width of the tooth is approximately 0.079 inches. It is been found that the tungsten and PCD materials are preferable for use in the present cutting configuration of the blade. Other tip materials, such as tungsten carbide or other hardened metals may also be utilized. FIG. 3 shows a cutaway view of the blade 20 taken along line 3—3 of FIG. 1 As shown in the drawing, tooth tip 28 has a tooth edge 29 extending horizontally perpendicular to the plane of the plate.

In this four-tooth embodiment, the use of these tooth tips is appropriate for cutting stacked and single sheets of fiber cement material. Preferably, the maximum speed of the blade is 8300 RPM. The recommended speed of the blade 20 is approximately 4000 RPM for cutting conventional fiber cement materials.

Figure 4:
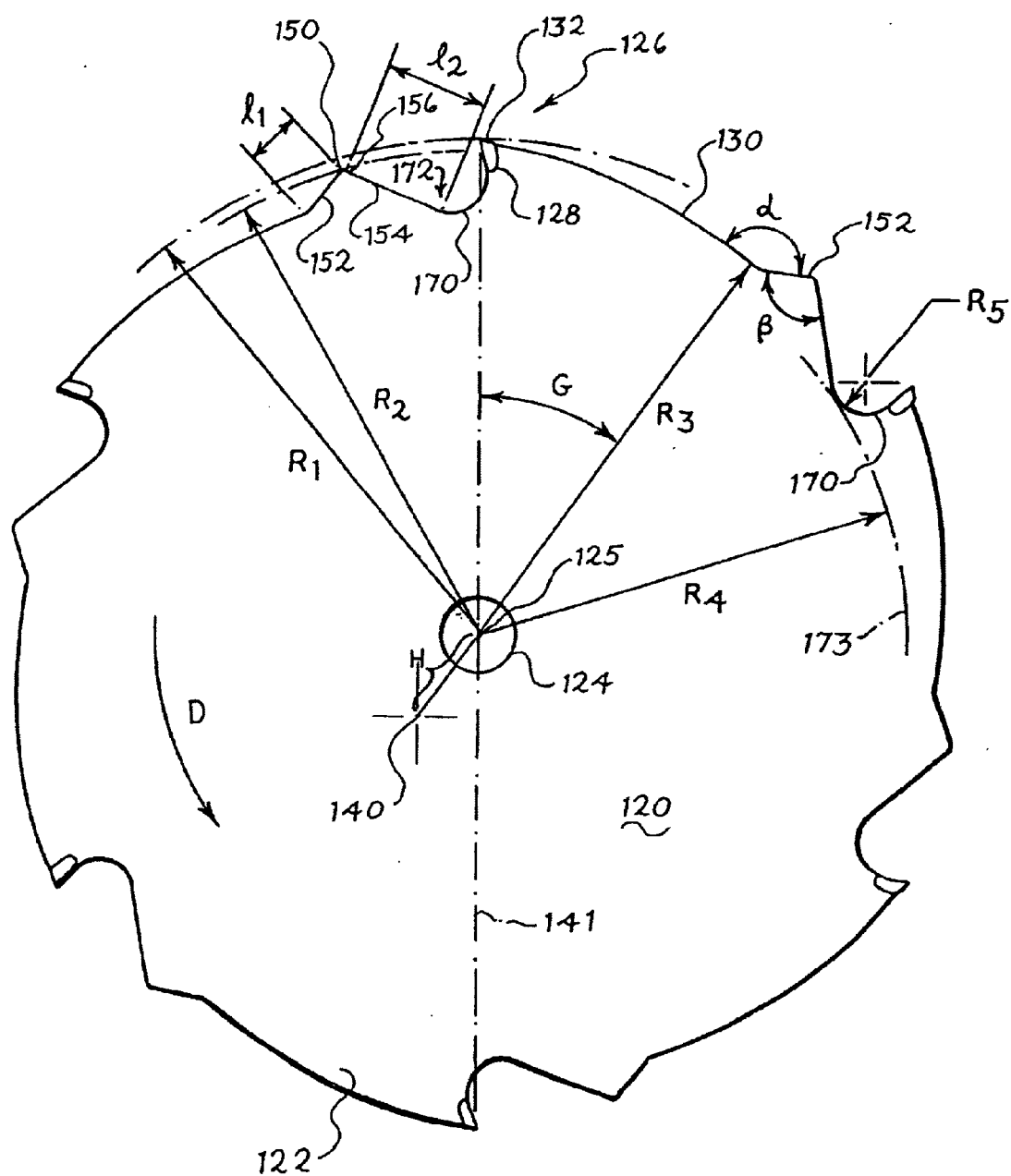
FIG. 4 is a side view of a second embodiment of the saw blade of the present invention, showing a six-tooth design.

FIG. 4 shows a second, six-tooth embodiment of the present invention. FIG. 4 contains reference numerals corresponding to the reference numerals of the embodiment shown in FIG. 1. The blade 120 of FIG. 4 includes generally identical features to the four-tooth blade of FIG. 1, such as a plate 122 having a hole 124 defined in the center thereof for mounting the saw blade 122 into an arbor, and teeth 126 including tooth tips 128 distributed at equal distances about the periphery of the plate 122 with some differences in scale to accommodate the equally-spaced six total teeth and the use of carbide tooth tips. In particular, the radius R1 in this embodiment is preferably 3.625 inches and the radius R2 at the peak 156 of the peaked shoulder 150 is approximately 3.53 inches. The radius R3 of the offset arc of the receding tooth support portion 130 is angled at 56.62 degrees clockwise from the centerline 141 and the offset center 140 is offset by a distance H of approximately 0.57 inches from the center 125 along the radius R3.

The length l1 of the forwardly sloping portion of the shoulder 150 is preferably 0.36 inches and the length l2 of the rearwardly sloping portion 154 is approximately 0.74 inches. The radius R4 of the gullet arc 173 is preferably 3.129 inches. The radius R5 of the portion 170 of the gullet 172 is approximately 0.24 inches. The angle between the tooth support portion 130 and the forwardly sloping portion 152 (angle α) is approximately 120 degrees, and the angle β between the sloped portions 152 and 154 of the peaked shoulder 150 ranges between 90 and 110 degrees. The hook angle of each tooth tip 132 is preferably 15 degrees, and the width of each tooth tip 132 is 0.67 inches.

Like the previous embodiment, this second embodiment of the blade 120 provides for more efficient, cooler and cleaner cutting of the fiber cement materials. The blade 120 has less of a tendency to kick back or cause damage to the power tool and the object being cut. Furthermore, the comparatively lower number of cutting teeth on the blade 120 produces significantly less dust when cutting fiber cement materials than a conventional blade.

Of course, it should be understood that a wide range of changes and modifications could be made to the preferred embodiment described above. In particular, some of the specific measurements noted herein may be changed without departing from the invention. Thus, it is intended that the foregoing detailed description be regarded as illustrative rather than limiting and that it be understood that it is the following claims, including all equivalents, which are intended to define the scope of this invention.

What is claimed is:

1. A rotary saw blade for use in cutting fiber cement board material, said blade comprising:
    a generally circular main body plate having opposed planar surfaces and a central opening with respect to its axis of rotation;
    a plurality of cutting teeth disposed about the periphery of said plate, said teeth being within said planes of the planar surfaces, each of said teeth having a radially outermost cutting edge;
    a plurality of peaked shoulders distributed about the periphery of said plate in front of each of said cutting teeth, said peaked shoulders being within said planes of said planar surfaces, each of said shoulders being at least partially defined by a forwardly sloping portion, a peak, and a rearwardly sloping portion, said rearwardly sloping portion having a length at least twice the length of said fowardly sloping portion, said peaks of said shoulders having a radial extension less than that of said cutting edges of said teeth, wherein said peaked shoulders act as a guide for said cutting teeth by limiting the depth of penetration of each of said cutting teeth;
    each cutting tooth and should defining a section, each section being spaced about the circumference of said main body plate and being spaced apart from each other section by a smooth sloping arcuate section;
    a plurality of hook-shaped gullets distributed about the periphery of said plate between said shoulders and said cutting teeth, each of said gullets being at least partially defined by said rearwardly sloping portion of an adjacent shoulder and an arcuate portion having a partially circular shape; and
    a plurality of tooth support portions extending between the rear of each tooth to said forwardly sloping portion of said shoulders.

2. The saw blade of claim 1 wherein said tooth support portions further comprise an arcuate shape.

3. The saw blade of claim 2 wherein said arcuate tooth support portions further comprise a gradually reduced radius measured from said axis of rotation of said main body from the rear of each tooth to said forwardly sloping portion of said shoulders.

4. The saw blade of claim 2 wherein said arcuate tooth support portions each have a radial center spaced from said axis of rotation of said main body.

5. The saw blade of claim 4 wherein said arcuate portions of said hook-shaped gullets further comprise reversed arcuate shapes.

6. The saw blade of claim 5 wherein said cutting teeth further comprise diamond impregnated tooth tips.

7. The saw blade of claim 5 wherein said cutting teeth further comprise carbide tooth tips.

8. The saw blade of claim 7 wherein said blade includes between 4 and 10 teeth.

9. The saw blade of claim 7, wherein the outermost portion of each of said peaked shoulders has a radius R2 from the axis of rotation of said main body plate.

10. The saw blade of claim 9, wherein the outer edge of each of said tooth tip has a radius R1 from the axis of rotation of said main body plate.

11. The saw blade of claim 10, wherein R2 is less than R1.

12. A rotary saw blade comprising:
    a main body plate having opposed planar surfaces and a central opening with respect to its axis of rotation;
    a plurality of cutting teeth disposed about the periphery of said plate, said teeth having an edge tracing a cutting arc, said teeth being within said planes of the planar surfaces;
    a plurality of arcuate tooth support portions, each of said tooth support portions extending rearwardly from said cutting teeth and having a center of curvature offset from said axis of rotation;
    a plurality of peaked shoulders distributed about the periphery of said plate rearwardly of said tooth support portions, each of said shoulders having a forwardly sloping portion, a peak, and a rearwardly sloping portion, said peaked shoulders being within said planes of said planar surfaces, said peaks of said shoulders having a radial extension less than a radial extension of said cutting edges of said teeth, wherein said peaked shoulders act as a guide for said cutting teeth by limiting the depth of penetration of each of said cutting teeth, said peaks tracing a guiding arc that is radially less than said cutting arc;
    each cutting tooth and should defining a section, each section being spaced about the circumference of said main body plate and being spaced apart from each other section by a smooth sloping arcuate section; and
    a plurality of hook-shaped gullets distributed about the periphery of said plate between said shoulders and said cutting teeth, each of said gullets being at least partially defined by said rearwardly sloping portion of an adjacent shoulder and an arcuate portion.

13. The saw blade of claim 12 wherein said blade includes between 4 and 10 teeth.

14. The saw blade of claim 13 wherein said arcuate tooth support portions further comprise a gradually reduced radius measured from said axis of rotation of said main body from the rear of each tooth to said forwardly sloping portion of said shoulders.

15. The saw blade of claim 13 wherein said peak further comprises an arcuate portion.

16. The saw blade of claim 15 wherein said arcuate portions of said hook-shaped gullets further comprise reversed arcuate shapes.

17. The saw blade of claim 16, wherein the outermost portion of each of said peaked shoulders has a radius R2 from the axis of rotation of said main body plate.

18. The saw blade of claim 17, wherein the outer edge of each of said tooth tip has a radius R1 from the axis of rotation of said main body plate.

19. The saw blade of claim 18, wherein R2 is less than R1.

20. The saw blade of claim 16 wherein said cutting teeth further comprise diamond impregnated tooth tips.

21. The saw blade of claim 16 wherein said cutting teeth further comprise carbide tooth tips.

22. A method of cutting fiber cement board material, said method comprising the steps of:

provide a hand-held power tool;

attaching a blade to said power tool, said blade including a main body plate having opposed planar surfaces and a central opening with respect to said axis of rotation;

between four and ten cutting teeth disposed about the periphery of said plate, said teeth being within said planes of said planar surfaces, each of said cutting teeth having an outermost cutting edge;

a plurality of arcuate tooth support portions, each of said tooth support portions extending rearwardly from said cutting teeth and having a center of curvature offset from said axis of rotation;

a plurality of peaked shoulders distributed about the periphery of said plate rearwardly of said tooth support portions, each of said shoulders having a forwardly sloping portion, a peak, and a rearwardly sloping portion, said peaked shoulders being within said planes of said planar surfaces, said peaks of said shoulders having a radial extension less than that of said cutting edges of said teeth, wherein said peaked shoulders act as a guide for said cutting teeth by limiting the depth of penetration of each of said cutting teeth;

each cutting tooth and should defining a section, each section being spaced about the circumference of said main body plate and being spaced apart from each other section by a smooth sloping arcuate section;

a plurality of hook-shaped gullets distributed about the periphery of said plate between said shoulders and said cutting teeth, each of said gullets being at least partially defined by said rearwardly sloping portion of an adjacent shoulder;

providing a fiber cement board; and cutting said board using said power tool.

* * * * *